United States Patent

Sacripante et al.

[11] Patent Number: 5,989,325
[45] Date of Patent: Nov. 23, 1999

[54] INK COMPOSITIONS

[75] Inventors: Guerino G. Sacripante, Oakville; H. Bruce Goodbrand, Hamilton; Danielle C. Boils, Mississauga, all of Canada

[73] Assignee: Xerox Corporation, Stamford, Conn.

[21] Appl. No.: 09/035,545

[22] Filed: Mar. 5, 1998

[51] Int. Cl.$^6$ .................................................. C09D 11/02
[52] U.S. Cl. ................................. 106/31.27; 106/31.29; 106/31.3; 106/31.58; 106/31.6; 106/31.61; 106/31.62; 106/31.86
[58] Field of Search ................................ 106/31.29, 31.3, 106/31.58, 31.61, 31.62, 31.86, 31.27, 31.6

[56] References Cited

U.S. PATENT DOCUMENTS

| | | | |
|---|---|---|---|
| 4,490,731 | 12/1984 | Vaught | 106/31.39 |
| 4,751,528 | 6/1988 | Spehrley, Jr. et al. | 346/140 R |
| 4,791,439 | 12/1988 | Guiles | 346/140 R |
| 4,840,674 | 6/1989 | Schwarz | 106/31.43 |
| 4,853,036 | 8/1989 | Koike et al. | 106/31.58 |
| 5,006,170 | 4/1991 | Schwarz et al. | 106/31.29 |
| 5,021,802 | 6/1991 | Allred | 346/1.1 |
| 5,041,161 | 8/1991 | Cooke et al. | 106/31.29 |
| 5,122,187 | 6/1992 | Schwarz et al. | 106/31.29 |
| 5,124,718 | 6/1992 | Koike et al. | 346/1.1 |
| 5,439,515 | 8/1995 | Kurabayashi et al. | 106/31.37 |
| 5,462,591 | 10/1995 | Karandikar et al. | 106/31.29 |
| 5,531,817 | 7/1996 | Shields et al. | 106/31.38 |
| 5,554,212 | 9/1996 | Bui et al. | 106/31.29 |
| 5,667,568 | 9/1997 | Sacripante et al. | 106/31.43 |
| 5,688,312 | 11/1997 | Sacripante et al. | 106/31.49 |
| 5,688,440 | 11/1997 | Garner | 252/315.1 |
| 5,700,316 | 12/1997 | Pontes et al. | 106/31.58 |

*Primary Examiner*—Helene Klemanski
*Attorney, Agent, or Firm*—E. O. Palazzo

[57] ABSTRACT

A nonaqueous ink composition comprised of a vehicle, colorant, and a hydrophobic gelling component.

28 Claims, No Drawings ent applications and patents, such as
INK COMPOSITIONS

REFERENCE TO PATENTS AND COPENDING PATENT APPLICATIONS

Hot melt inks are illustrated in copending patent applications U.S. Ser. No. 624,273, and U.S. Ser. No. 641,866, and U.S. Pat. Nos. 5,688,312; 5,667,568; 5,700,316; and 5,698,017, the disclosures of each of these applications being totally incorporated herein by reference.

Hot melt inks are also disclosed in copending applications U.S. Ser. Nos. 933,914, 935,889, 935,639, and 936,084, the disclosures of each of these applications being totally incorporated herein by reference in their entireties.

A number of the appropriate components and processes of the above copending pat the colorants, ink additives, and the like may be selected for the inks of the present invention in embodiments thereof.

BACKGROUND OF THE INVENTION

The present invention is directed to phase change or hot-melt ink compositions containing a colorant, a vehicle and a gelling agent component, and, more specifically, the present invention relates to hot melt inks with for example, a melting point of between about 25° C. and about 150° C., and preferably from about 30° C. to about 70° C., and which inks are especially useful for acoustic ink printing processes and apparatuses, reference, for example, U.S. Pat. No. 5,121,141, U.S. Pat. No. 5,111,220, U.S. Pat. No. 5,128,726, U.S. Pat. No. 5,371,531, the disclosures of which are totally incorporated herein by reference, including especially acoustic ink processes as illustrated in a number of the aforementioned copending applications and patents, such as an acoustic ink printer for printing images on a record medium.

More specifically, the phase change inks of the present invention are comprised of a colorant such as a dye or pigment, a vehicle such as a liquid, a solid hydrocarbon or wax, or mixture of a liquid and solid vehicle, and other known vehicles, and a gelling agent as illustrated herein, which primarily causes the ink to gel at a temperature of for example, from about 20° C. to about 100° C., and more specifically about 40° C. to about 90° C. (about to about includes all values in between throughout). The gelling agent of the present invention can cause gelling of for example, hydrophobic or non-polar liquids such as toluene, hexane, pentane, octane, Isopar, Magiesol available from Magie Brothers, and more specifically, the gelling agent, or component is useful for the gellation of inks. With the inks of the present invention there can be generated excellent developed images on plain and coated papers with acceptable image permanence, excellent projection efficiency on transparencies without needing a post fusing step, and excellent crease resistance, and wherein the inks possess acceptable, and in embodiments superior lightfastness, and superior waterfastness. Moreover, in embodiments of the present invention there is enabled the elimination, or minimization of undesirable paper curl since water need not be present in the invention inks, and it is preferred that there be an absence of water, and since water is preferably not present in the inks a dryer can be avoided thereby minimizing the cost of the acoustic ink jet apparatus and process. Furthermore, with the present invention in embodiments there is enabled inks with a low viscosity, for example from about 1 centipoise to about 10 centipoise at a temperature of for example, from about 40° C. to about 125° C., and preferably from about 40° C. to about 70° C. as measured by Carrim-Med CSL-100 rheometer TA Instrument, and which inks can be utilized at low jetting temperatures with an acoustic printing device, for example low temperatures of less than about 130 degrees Centigrade, and more specifically from about 50° C. to about 125° C.

PRIOR ART

In acoustic ink printing, the printhead generates for example, approximately 2.2 picoliter droplets by an acoustic energy process. The ink under these conditions should preferably display a melt viscosity of about 5 to about 20 centipoise or less at the jetting temperature. Furthermore, once the ink is jetted onto the paper, the ink image should be of excellent crease property, and should be non-smearing, waterfast, of excellent transparency and excellent fix qualities. In selecting an ink for such applications, it is desirable that the vehicle display a low melt viscosity, such as from about 1 centipoise to about 25 centipoise in the acoustic head, while also displaying solid like properties after being jetted onto paper. Since the acoustic head can tolerate a temperature up to about 180° C., and preferably up to a temperature of from about 140° C. to about 160° C., the vehicle for the ink should preferably display liquid like properties, such as a preferred viscosity of from about 1 to about 10 centipoise at a temperature of from about 75° C. to about 165° C., and solidify or harden after jetting onto paper, such that the ink displays a hardness value of from about 0.1 to about 0.5 millimeters, which hardness is determined by a penetrometer according to the ASTM penetration method D1321.

Ink jet printing processes that select inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is usually selected with a melting point above room temperature so that the ink which is melted in the apparatus will not be subject to evaporation or spillage during periods of nonprinting. The vehicle selected possesses a low temperature to permit the use of the solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Hot melt ink jets are somewhat similar to thermal ink jets, however, a hot melt ink usually contains no solvent. Thus, rather than being liquid at room temperature, a hot melt ink is typically a solid or semi-solid possessing a wax-like consistency. These inks usually need to be heated, for example, to approximately 100° C. before the ink melts and is converted into a liquid. With hot melt inks, a plurality of ink jet nozzles are provided in a printhead. A piezoelectric vibrating element is located in each ink channel upstream from a nozzle so that the piezoelectric oscillations propel ink through the nozzle. After the hot melt ink is applied to the substrate, the ink is resolidified by freezing on the substrate.

One advantage of thermal ink jets is their compact design for the integrated electronics section of the printhead. Thermal ink jets are disadvantageous in that the thermal ink has a tendency to soak into a plain paper medium. This can blur the print or thin out the print locally thereby adversely affecting print quality. Problems have been encountered with thermal ink jets in attempting to remove from the ink moisture in a rapid manner so that the ink does not soak into a plain paper medium.

One advantage of a phase-change or hot melt ink jet is their ability to print on coated substrates such as coated papers and overhead transparencies yielding photographic quality images, since for example, the semi-solid hot melt ink quickly spreads on the surface of the coated paper and transparencies.

In U.S. Pat. No. 4,751,528, the disclosure of which is totally incorporated herein by reference, there is disclosed a semi-solid hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level.

Further, U.S. Pat. No. 4,791,439, the disclosure of which is totally incorporated by reference, discloses an apparatus for use with semi-solid hot melt inks having an integrally connected ink jet head and reservoir system.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose semi-solid hot melt ink compositions suitable for ink jet printing which inks comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like.

U.S. Pat. No. 5,041,161, the disclosure of which is totally incorporated herein by reference, discloses an ink jet ink which is semi-solid at room temperature.

U.S. Pat. No. 4,853,036 and U.S. Pat. No. 5,124,718 disclose an ink for ink jet recording which comprise, for example, a liquid composition essentially comprising colorant, a volatile solvent with a vapor pressure of 1 millimeter Hg or more at 25° C., and a component that is solid at room temperature and having a molecular weight of 300 or more.

Hydrophobic gelling agents are known, but very uncommon, reference Meakins et al., J. Chem. Soc. (C), p. 1106, wherein the gelling agent trans-4-t-butyl-1-phenylcyclohexanol (Formula 1, wherein R=Hydrogen) is disclosed, the synthesis of which was first reported it is believed by Patterson, J.Am.Chem.Soc. 85, 3228 (1963). Moreover, derivatives of similar gelling agents are reported by Garner and Mistrot, Chemical Engineering News, Vol p. 1995, and Proceedings from the ACS meeting, New Orleans (1995), and U.S. Pat. No. 5,688,440, the disclosure of which is totally incorporated herein by reference. However, the use of a gelling agent in an ink is not known it is believed, and the gelling of a liquid or paste ink into a solid would, it was known, result in low viscosity properties such as from about 1 to about 10 centipoise at a jetting temperature of from about 60 to about 125° C. For instance, it is known that aqueous gelling agents such as cellulosic derivatives or polyvinyl alcohols have a tendency to increase the viscosity of the aqueous mixture, thus the discovery that the hydrocarbon gelling agents of the present invention did not for example, increase the viscosity of the ink was unexpected and not anticipated.

In acoustic ink printing, the viscosity of inks should be low, such as most preferably from about 1 to about 5 centipoise during jetting. Thus, inks which are liquid or of soft texture such as a paste, at ambient temperatures, are easily jetted at low temperatures, such as from about 1 to about 10 centipoise at temperatures below about 100° C. However, when liquid inks are jetted on paper poor adhesion, intercolor bleeding or poor smear properties are obtained. To overcome this print quality deficiency, inks which are solid at ambient temperatures and liquid at higher temperatures are selected, such that a low viscosity is attained during jetting on paper, and once the inks are cooled on the paper by ambient conditions, it solidifies and there results improved adhesion and smear properties. These inks are referred to as phase change inks, because they are liquid at high temperatures and change to solid at ambient temperatures.

SUMMARY OF THE INVENTION

While the known ink compositions and processes may be suitable for their intended purposes, a need remains for phase change or hot melt ink compositions suitable for ink jet printing and preferably for acoustic ink printing. In addition, there is a need for a phase change or hot melt ink compositions which are of low viscosity, such as less than about 10 centipoise, for example from about 1 to about 10, and preferably from 1 to about 5 centipoise (cp), at a very low jetting temperature, preferably less than about 150° C., and more preferably of from about 50° C. to about 125° C., and which inks are compatible with a wide variety of plain papers and generate photographic quality images on coated papers. Further, there is a need for semi-solid hot melt ink compositions which generate high quality, lightfast, and excellent waterfast images on plain papers. There is also a need for semi-solid hot melt ink jet ink compositions which generate high quality, fast-drying images on a wide variety of plain papers at low cost with high quality text and high quality graphics, and wherein the colorant, such as the dye is retained on the paper surface while the ink vehicle can continue to spread within the paper structure. Further, there is a need for hot melt ink jet ink compositions which exhibit minimal feathering. Additionally, there is a need for semi-solid hot melt ink jet ink compositions which exhibit minimal intercolor bleed. There is also a need for semi-solid hot melt ink jet ink compositions which exhibit excellent image permanence. Further, there is a need for hot melt ink jet ink compositions which are suitable for use in acoustic ink jet printing processes. Additionally, there is a need for hot melt ink compositions suitable for ink jet printing processes wherein the substrate is heated prior to printing and is cooled to ambient temperature subsequent to printing (delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided, and wherein excellent crease characteristics are achievable, low smearing of the images results, the inks possess a low viscosity thereby enabling the inks to be jetted at low temperature, which is advantageous in that less power is utilized and wherein there is enabled an extension of the life of the printhead. These and other needs can be achievable with the inks of the present invention in embodiments thereof.

Examples of features of the present invention include, for example:

It is an feature of the present invention to provide a phase change hot melt ink compositions with many of the advantages illustrated herein.

It is another feature of the present invention to provide gelled solid hot melt nonaqueous ink compositions suitable for acoustic ink jet printing.

It is yet another feature of the present invention to provide phase change or hot melt ink compositions which are compatible with a wide variety of plain papers and yield photographic quality images on coated papers.

It is still another feature of the present invention to provide a hot melt ink compositions which generate high quality images on plain papers.

Yet another feature of the present invention is to provide hot ink jet ink compositions which exhibit low viscosity of from about 1 to about 10 centipoise at a temperature of from about 50° C. to about 125° C.

Still another feature of the present invention is to provide a gelled ink jet ink compositions which exhibit minimal intercolor bleed.

It is another feature of the present invention to provide gelled ink jet ink compositions which exhibit excellent waterfastness and, lightfastness image permanence.

It is yet another feature of the present invention to provide gelled jet ink compositions that contain substantially no water and which are suitable for use in acoustic ink jet printing processes.

It is still another feature of the present invention to provide hot ink compositions that contain no water, or minimal water, and that are suitable for ink jet printing processes, wherein the substrate is heated prior to printing and is cooled to ambient temperature subsequent to printing (heat and delay printing processes).

Another feature of the present invention is to provide ink compositions suitable for ink jet printing wherein high optical densities can be achieved with relatively low colorant concentrations.

Yet another feature of the present invention is to provide water-free hot melt ink compositions suitable for ink jet printing wherein curling of the substrate subsequent to printing is minimized.

Another feature of the present invention resides in the provision of semi-solid hot melt inks wherein the viscosity of the ink is preferably from about 1 centipoise to about 10 centipoise at, for example, the jetting temperature which can be from about 50° C. to about 125° C., and preferably a lower jetting temperature of from about 50° C. to about 80° C. thereby enabling excellent jetting at reasonable power levels.

The present invention relates to components for enabling the gelling of hydrocarbons, and more specifically the present invention relates to ink compositions comprised of an ink vehicle, colorant, and a gel component of an aklylarylcycloalkanol as illustrated for example, in the Formula that follows, and more specifically trans 4-tertiary-butyl-1-phenyl-cyclohexanol, and which component can be present in the ink in various suitable amounts, for example from about 0.5 to about 10, and preferably from about 1 to about 3 percent by weight, and wherein the total of all ink components is about 100 percent, or 100 parts. The gelling component can for example, permit in inks with a low melting point of from about 20° C. to about 60° C., without altering the viscosity of the ink, of from about 1 to about 10 centipoise at jetting temperatures of from about 50° C. to about 125° C..

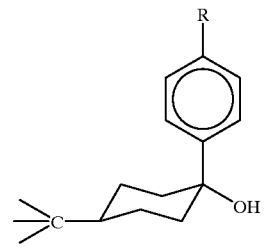

wherein R is preferably alkyl, aryl, alkoxy, hydrogen, halide, or a hydrocarbon halide.

In the present invention liquid inks comprised of a colorant and hydrophobic liquid vehicle(s) can be gelled, and more specifically the liquids inks may be gelled with a low concentration of gelation agents, such as from about 0.5% to about 3% by weight of the ink. These gelled inks, have melting points in the range of, for example, from about 25° C. to about 60° C., and once melted to temperatures of from about 50 to about 80° C., display a low viscosity, such as from about 0.3 to about 10 centipoise as measured by Carrim-Med CSL -100 rheometer, available TA Instrument and are easily jetted by the acoustic ink printing device. Once jetted on paper, and cooled by ambient conditions, the inks phase change from a liquid state to a solid gelled state and there results improved adhesion and improved smear properties, and with no intercolor bleeding as compared to liquid inks without the gelling agent. The present invention is also directed to the gelling of non-liquid inks, such as semi-solid or pasted inks, in which the melting points thereof are increased or gelled to a solid consistency thereby providing excellent ink adhesion and superior ink smear characteristics on paper.

Aspects of the present invention relate to:

a nonaqueous ink composition comprised of a vehicle, colorant, and a hydrophobic gelling component;

an ink composition, preferably nonaqueous, comprised of a vehicle, colorant, and an aklylarylcycloalkanol gelling component;

an ink wherein the gelling component is trans 4-tertiary-butyl-1-phenyl-cychexanol;

an ink wherein the gelling component is an aklylarylcycloalkanol of the formula as illustrated herein.

an ink wherein the gelling component is present in an amount of from about 0.5 to about 10 weight percent;

an ink wherein the gelling component is trans-4-t-butyl-1-phenylcyclohexanol;

an ink wherein the gelling component is present in an amount of from about 0.5 to about 3 weight percent;

an ink wherein the gelling component is present in an amount of from about 0.5 to about 10 weight percent;

an ink wherein the gelling component is present in an amount of from about 0.5 to about 2 weight percent;

an ink wherein the vehicle is a liquid at ambient temperature;

an ink composition wherein the vehicle is a solid of a hydrocarbon wax, an oxazoline, a benzoxazoline, an amide or an amino ester;

an ink composition wherein the oxazoline vechile is selected from the group consisting of 2-stearyl-5-ethyl-5-methoxystearate-oxazoline, 2-stearyl-5-ethyl-5- hydroxymethyl-oxazoline, 2-stearyl-4-ethyl-oxazoline, 2-stearyl-4-methoxystearate-oxazoline, 2-stearyl-4-hydroxymethyl-oxazoline, 2-stearyl-4-hydroxymethyl-bis-5,5-(methoxystearate)-oxazoline, 2-stearyl-5-hydroxymethyl-5-(methoxystearate)-oxazoline, and 2-stearyl-benzoxazoline;

an ink composition wherein the vehicle is a hydrocarbon wax with from about 18 to about 1,000 carbon atoms;

an ink composition wherein the vehicle is a liquid of heptane, octane, nonane, dodecane, Isopar, Magiesol, toluene, xylene, terpine, naphtha;

an ink composition wherein the vehicle is a mixture, about 10/90 to about 90/10 of a liquid vehicle and a solid vehicle;

an ink composition wherein the ink viscosity is from about 1 centipoise to about 10 centipoise at a temperature of from about 50 to about 120° Centigrade, and wherein the ink is a solid at room temperature of from about 20° C. to about 40° C.;

an ink composition wherein the colorant is a dye present in an amount of from about 0.05 to about 20 weight percent, or wherein the colorant is a dye present in an amount of from about 1 to about 5 weight percent, and wherein the colorant is a dye of cyan, magenta, yellow, blue, green, brown, black, or mixtures thereof;

a printing process which comprises incorporating into an acoustic ink jet printer an ink comprised of a vehicle, colorant, and an aklylarylcycloalkanol gelling component;

a process wherein the ink is nonaqueous and wherein the ink possesses a viscosity of about 1 centipoise to about 25 centipoise at a temperature of from about 50° C. to about 125° C.;

a process which comprises (a) providing an acoustic ink printer having a pool of liquid ink with a free surface, and a printhead including at least one droplet ejector for radiating the free surface of the ink with focused acoustic radiation to eject individual droplets of ink therefrom on demand, the radiation being brought to focus with a finite waist diameter in a focal plane, the ink comprising a vehicle, colorant, and an aklylarylcycloalkanol gelling component and (b) causing droplets of the ink to be ejected onto a recording sheet in an imagewise pattern at a temperature of from about 50° C. to about 125° C.;

a process wherein the ink is nonaqueous and wherein the ink possesses a viscosity of from about 1 centipoise to about 25 centipoise at a temperature of from about 50° C. to about 125° C.;

an ink composition comprised of a colorant, a gelling component of the formula as illustrated herein.

an ink wherein the gelling component is trans 4-tertiary-butyl-1-phenyl-cyclohexanol, the vehicle is an oxazoline or benzoxazoline, and which ink possesses a viscosity of from about 1 centipoise to about 25 centipoise at a temperature of from about 50° C. to about 125° C.;

an ink wherein the alkyl contains about 1 to about 25 carbon atoms, and the aryl contains about 6 to about 30 carbon atoms;

an ink wherein the gelling component is an aklylarylcycloalkanol; and an ink wherein the gelling component is trans 4-tertiary-butyl-1-phenyl-cyclohexanol;

Examples of ink vehicles are known, and other examples are illustrated in the copending applications recited herein.

Specific examples of ink vehicles are hydrocarbon liquids such as Isopar, Magiesol, Naphtha, Terpines, or hydrocarbon waxes such as polyethylene with from about 18 to about 1,000, and preferably from about 25 to about 700 carbon atoms, for example the Unilin series with for examples about 350 to about 700 carbon atoms, or the Polywax series such as P-500, P-1000. P-3000, EP-700 all available from Petrolite; the oxazolines of U.S. Pat. No. 5,698,017; organic alcohols, amides, esters, ester-amides, bisteramides and the like. The ink vehicle is present in various suitable amounts, for example from about 2 to about 90, and preferably from about 25 to about 50 percent by weight, or parts. The ink vehicle can be a liquid vehicle or a solid vehicle at ambient temperatures, and which vehicles are preferably low viscosity liquids, such as from about 1 to about 10 centipoise at elevated temperatures of from about 50° C. to about 150° C.

Preferably the gelling component is trans 4-tertiary-butyl-1-phenyl-cychexanol. Examples of gelling components include those thereof as illustrated in the Formula, wherein R is as indicated herein, such as alkoxy, alkyl with for example, from 1 to about 25, and preferably from 2 to about 18 carbon atoms, and aryl with for example, from about 6 to about 30 carbon atoms, and more specifically wherein for example R=H, $OCH_3$, $CF_3$, Cl, Br, I, F, or Ph. Alkyl preferably contains for example, from about 2 to about 18 carbons, like methyl, ethyl, propyl, butyl, pentyl, hexyl, octyl, stearyl, and the like, alkoxy is preferably methoxy, propoxy, ethoxy or butoxy and aryl can be phenyl napthlyl, benzyl, and the like. Examples of specific gelling agents, or components are trans 4-tertiary-butyl-1-phenyl-cyclohexanol, trans 4-tertiary-butyl-1-4'fluorophenyl-cyclohexanol, trans 4-tertiary-butyl-1, 4'methoxyphenyl-cyclohexanol, trans 4-tertiary-butyl-1-4'chlorophenyl-cyclohexanol, and trans 4-tertiary-butyl-1-biphenyl-cyclohexanol. These gelling components are present in various suitable amounts such as for example, about 0.5 to about 10 percent by weight, and preferably from about 1 to about 3 percent by weight of the ink.

Optional lightfast UV absorbers optionally present in the ink composition include for example, (1) 2-(2'-hydroxy-5'-methylphenyl) benzotriazole, available as Tinuvin 900, from Ciba Geigy Corporation; (2) 2-[2'-hydroxy-3,5-di-(1,1-dimethylbenzyl)phenyl]-2H-benzotriazole, available as Topanex 100 BT, from ICI America Corporation; (3) bis[2-hydroxy-5-tert-octyl-3-(benzotriazol-2-yl) phenyl methane, available as Mixxim BB/100, from Fairmount-Corporation; (4) 2-(3',5'-di-tert-butyl-2'-hydroxyphenyl)-5-chlorobenzo triazole, available as Tinuvin 327, from Ciba Geigy Corporation; (5) 2-(4-benzoyl-3-hydroxyphenoxy)ethylacrylate (Cyasorb UV-416, #41,321-6, available from Aldrich Chemical Company), (6) tris(3,5-di-tert-butyl-4-hydroxybenzyl) isocyanurate, available as Good-rite UV 3114, from Goodrich Chemicals, and the like, and optional lightfast antioxidants for the ink compositions include for example: (1) bis-(1,2,3,6-tetrahydrobenzaldehyde) pentaerythritol acetal, available as Vulkazon AFS/IG, from Mobay Corporation; (2) dioctadecyl 3,3'-thiodipropionate, available as Cyanox, STDP, #41,310-0, from Aldrich Chemical Company; (3) 2,2,4-trimethyl-1,2-hydroquinoline, available as Vulkanox HS, from Mobay Corporation; (4) octylated diphenylamine, available as Anchor ODPA, from Anchor Corporation; (5) N,N'-β,β'-naphthalene-p-phenylenediamine, available as Anchor DNPD, from Anchor Corporation; (6) ethyl(R)-(+)-2-{4-[trifluoromethyl) phenoxy] phenoxy}propionate, (Aldrich #25,074-0); (7) 3-hydroxy-2,2-dimethylpropyl-3-hydroxy-2,2-dimethylpropionate, (Aldrich #39,024-0), and the like.

Suitable colorants, present in an effective amount generally of from about 1 to about 25, and more specifically for example, from about 2 to about 5 percent by weight, include pigments, dyes, mixtures of pigments, mixtures of dyes, and the like with solvent dyes being preferred. Any dye or pigment may be selected providing for example that it is capable of being dispersed or substantially dissolved in the vehicle and is compatible with the other ink components.

Examples of suitable pigments include Violet Toner VT-8015 (Paul Uhlich), Paliogen Violet 5100 (BASF), Paliogen Violet 5890 (BASF), Permanent Violet VT 2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan III (Red Orange), (Matheson, Colemen Bell), Sudan II (Orange), (Matheson, Colemen Bell), Sudan Orange G (Aldrich), Sudan Orange 220 (BASF), Paliogen Orange 3040 (BASF), Ortho Orange OR 2673 (Paul Uhlich), Paliogen Yellow 152,1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Yellow L1250 (BASF), Suco-Yellow D1355 (BASF), Suco Fast Yellow D1355, D1351 (BASF), Hostaperm Pink E (American Hoechst), Fanal Pink D4830 (BASF), Cinquasia Magenta (Du Pont), Paliogen Black L0084 (BASF), Pigment Black K801 (BASF), and carbon blacks such as Regal 330® (Cabot), Carbon Black 5250, Carbon Black 5750 (Columbia Chemical Company).

Examples of suitable dyes include Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow #23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like.

Particularly preferred are solvent dyes, and within the class of solvent dyes, spirit soluble dyes are preferred primary because of their compatibility with the ink vehicles. Examples of suitable spirit solvent dyes include Neozapon Red 492 (BASF), Orasol Red G (Ciba-Geigy), Direct Brilliant Pink B (Crompton-Knolls), Aizen Spilon Red C- BH (Hodagaya Chemical Company), Kayanol Red 3BL (Nippon Kayaku Company). Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RLP(Ciba-Geigy), Savinyl Black RLS (Sandoz), Dermacarbon 2GT(Sandoz), Pyrazol Black BG (ICI), Morfast Black Conc.A (Morton-Thiokol), Diaazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI),Basacid Blue 750 (BASF), and the like.

Optional ink additives include biocides such as Dowicil 150, 200, and 75, benzoate salts, sorbate salts, and the like, present in effective amounts, such as for example an amount of from about 0.0001 to about 2 percent by weight, and preferably from about 0.01 to about 1.0 percent by weight. The amount of biocide is generally present in amounts of from about 10 to 25 milligrams per one gram of ink. Other ink additives, such as humectants, and the like can also be incorporated into the inks.

The inks of the present invention can be prepared by any suitable method, such as for example simply mixing, heating, and stirring the components.

Characteristics of the inks of the present invention are as indicated herein, such as a melting point of from about 25° C. to about 70° C., and a viscosity of from 1 centipoise to about 25, and preferably to about 10 centipoise as measured by Carrim-Med CSL-100 rheometer, available TA Instrument, at a temperature of from about 50° C. to about 125° C.

The inks of the present invention are particularly suitable for printing processes wherein the substrate, such as plain paper, coated paper, transparency, or the like, is heated during the printing process to facilitate formation of the liquid crystalline phase within the ink. When transparency substrates are employed, temperatures typically are limited to a maximum of about 100° C. to about 110° C., since the polyester typically employed as the base sheet for the transparency tends to deform at higher temperatures specially formulated transparencies and paper substrates can, however, tolerate higher temperatures, and frequently are suitable for exposure to temperatures of 150° C. or even 200° C. in some instances. Typical substrate heating temperatures are from about 40° C. to about 140° C., and preferably from about 60° C. to about 95° C., although the temperature can be outside these ranges.

The inks of the present invention are also suitable for use in acoustic ink jet printing processes. In acoustic ink jet printing, reference a number of the copending applications and patents recited here, the disclosures of which have been totally incorporated herein by reference, an acoustic beam exerts a radiation pressure against features upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, IBM Technical Disclosure Bulletin, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. The size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered.

Pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosity's and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of page width ejector arrays, ranging from (i) single row, sparse arrays for hybrid forms of parallel/serial printing to (ii) multiple row staggered arrays with individual ejectors for each of the pixel positions or addresses within a page width image field (i.e., single ejector/pixel/line) for ordinary line printing. Inks suitable for acoustic ink jet printing typically are liquid at ambient temperatures (i.e., about 25° C.), however in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in J. Appl. Phys., vol. 65, no. 9 May 1, 1989) and references therein, the disclosure of which is totally incorporated herein by reference.

The optical density measurements recited herein were obtained on a Pacificpectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information The lightfast values of the ink jet images were measured in the Mark V Lightfast Tester obtained from Microscal Company, London, England.

The waterfast values of the ink jet images were obtained from the optical density data recorded before and after washing with hot [50° C.] water for two minutes.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Synthesis of the gelling agent, trans-4-t-butyl-1-phenyl-cyclohexanol, from 4-t-butylcyclohexanone and phenylmagnesium bromide.

In a 1 liter round bottomed flask equipped with a magnetic stirrer, a condenser, a pressure equalizing dropping funnel and an argon purge was placed 250 ml of dry ether and 12.16 grams (0.5 mole) of magnesium turnings. Phenylmagnesium bromide was generated by the cautious dropwise addition of 78.51 grams (0.5 mole) of bromobenzene at a rate to maintain a relatively steady ether reflux. The Addition consumed approximately one hour. After stirring at room temperature, about 25 degrees Centigrade, for an additional 0.5 hour to ensure completion, the above titled product was generated by the slow addition of 69.41 g (0.45 mole) of 4-t-butylcyclohexanone dissolved in 50 ml of dry ethylether over 1 hour. The reaction mixture was then hydrolyzed by the addition of 200 ml of a dilute ammonium chloride solution. The resulting two phase mixture was then filtered to secure a product as an approximately 50:50 mixture of the cis and trans isomers of 4-t-butyl-1-phenyl-cyclohexanol. The nature of this mixture was readily revealed by nmr with the protons of the t-butyl groups appearing at 0.8 and 0.9 ppm. The trans isomer was then easily separated by gelation of ethyl acetate as follows: The 46 grams of the above obtained mixture was dissolved in 250 ml of hot ethyl acetate, followed by heating to about 60° C. On cooling to room temperature, about 25 degrees Centigrade throughout, the mixture sets, or forms to a semi-hard gel. Filtration and drying affords a highly enriched (approximately 90% by nmr) sample of the trans isomer product trans-4-t-butyl-1-phenyl-cyclohexanol with its t-butyl nmr signal appearing at 0.8 ppm relative to TMS. Repetition of this sequence affords the pure isomer, about 99.7 percent pure, with a mp of 158° (reported mp of 158–159, by Edgar W. Garbisch, Jr., and Dennis B. Patterson, J.Am.Chem.Soc., 53, 4978, 1988)

EXAMPLES II–IV

A series of gelled inks were then prepared by heating (to 80° C.) for a duration of about 10 minutes with stirring, a mixture of 3 percent by weight of Neopan Blue available from BASF, with 95 to 96% of Isopar L, and from about 0.5% to about 2% of trans-4-t-butyl-1-phenyl-cyclohexanol. After cooling to room temperature, about 25 degrees Centigrade, the viscosity and measured gel point (on cooling) as measured by Carrim-Med CSL-100 rheometer available TA Instrument, were tabulated in Table 1, wherein η represents viscosity and cp represent the viscosity in centipoise.

TABLE 1

| EXAMPLE No. | Gel Agent | Gel Point | η at 60° C. |
| --- | --- | --- | --- |
| II | 0.5% | 14° C. | 0.67 cp |
| III | 1% | 39° C. | 0.87 cp |
| IV | 2% | 43.5 | 1.6 cp |

EXAMPLES V–XI

A series of gelled inks were prepared by heating (to 125° C.) for a duration of about 10 minutes with stirring, a mixture of 3 percent by weight of Sudan Red available from BASF, with Isopar L and a solid vehicle comprised of either 2-stearyl-5-ethyl-5-methoxystearate-oxazoline, or polyethylene wax such as Vybar or EP-700 (available from Petrolite), and from about 1 to about 2% of the above prepared trans-4-t-butyl-1-phenyl-cyclohexanol. The vehicle represents 95% by weight of the ink and is

TABLE 2

| Example | Vehicle 1 | Vehicle 2 | Melting Point | η 80° C. |
| --- | --- | --- | --- | --- |
| V | Isopar L (40%) | Oxazoline (60%) | 30° C. | 3.5 cp |
| VI | Isopar G (20%) | EP-700 (80%) | 35° C. | 5.2 cp |
| VII | Magiesol 52 (50%) | Oxazoline (50%) | 32° C. | 4.8 cp |
| VIII | Magiesol-60 (50%) | Vybar (50%) | 25° C. | 3.6 cp |
| IX | Isopar L (20%) | Vybar (80%) | 45° C. | 5.6 cp |
| X | Isopar L (40%) | Vybar (60%) | 35° C. | 2.5 cp |
| XI | Isopar L (60%) | Vybar (40%) | 22° C. | 1.8 cp |

The viscosity and measured gel point (on cooling) were measured by Carrim-Med CSL-100 rheometer, available TA Instrument. All of the above inks were jetted at a temperature of 80° C. using an acoustic printing testing device on plain paper.

These inks when selected for acoustic jet printers enabled images of excellent resolution, images with superior waterfastness such as about 100 percent waterfastness, images with minimal intercolor bleed such as with a MFLEN of about 0 to 5, excellent image permanance, high image optical densities such as from about 1.2 to about 2 with relatively low dye concentrations, and wherein curling of the substrate subsequent to printing was minimized.

Other modifications of the present invention may occur to those skilled in the art subsequent to a review of the present application. The aforementioned modifications, including equivalents thereof, are intended to be included within the scope of the present invention.

What is claimed is:

1. A nonaqueous ink composition comprised of a vehicle, colorant, and a hydrophobic gelling component, and wherein said hydrophobic gelling component is of the formula

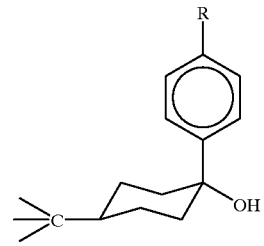

wherein R is alkyl, aryl, alkoxy, hydrogen, halide, or hydrocarbon halide.

2. An ink composition in accordance with claim 1, wherein said vehicle is a solid of a hydrocarbon wax, an oxazoline, a benzoxazoline, an amide ester or an amino ester.

3. An ink composition in accordance with claim 2, wherein said oxazoline is selected from the group consisting of 2-stearyl-5-ethyl-5-methoxystearate-oxazoline, 2-stearyl-5-ethyl-5-hydroxymethyl-oxazoline, 2-stearyl-4-ethyl-oxazoline, 2-stearyl-4-methoxystearate-oxazoline, 2-stearyl-4-hydroxymethyl-oxazoline, 2-stearyl-4-hydroxymethyl-bis-5,5-(methoxystearate)-oxazoline, 2-stearyl-5-hydroxymethyl-5-(methoxystearate)-oxazoline, and 2-stearyl-benzoxazoline.

4. An ink composition in accordance with claim 1, wherein the vehicle is a hydrocarbon wax with from about 18 to about 1,000 carbon atoms.

5. An ink in accordance with claim 1, wherein said alkyl and said alkoxy contains about 1 to about 25 carbon atoms, and said aryl contains about 6 to about 30 carbon atoms.

6. An ink in accordance with claim 1 wherein said gelling component is trans 4-tertiary-butyl-1-phenyl-cyclohexanol.

7. An ink composition comprised of a vehicle, colorant, and an aklylarylcycloalkanol gelling component.

8. An ink composition in accordance with claim 7, wherein said gelling component is trans 4-tertiary-butyl-1-phenyl-cyclohexanol.

9. An ink in accordance with claim 7, wherein said gelling component is present in an amount of from about 0.5 to about 10 weight percent.

10. An ink in accordance with claim 9, wherein said gelling component is trans-4-t-butyl-1-phenylcyclohexanol.

11. An ink in accordance with claim 7, wherein said gelling component is present in an amount of from about 0.5 to about 3 weight percent.

12. An ink in accordance with claim 8, wherein said gelling component is present in an amount of from about 0.5 to about 10 weight percent.

13. An ink in accordance with claim 8, wherein said gelling component is present in an amount of from about 0.5 to about 2 weight percent.

14. An ink in accordance with claim 7, wherein said vehicle is a liquid at ambient temperature.

15. An ink composition in accordance with claim 14, wherein the vehicle is a liquid of heptane, octane, nonane, dodecane, toluene, xylene, terpine, or naphtha.

16. An ink composition in accordance with claim 14, wherein the vehicle is a mixture of a liquid vehicle and a solid vehicle.

17. An ink composition in accordance with claim 7, wherein the ink viscosity is from about 1 centipoise to about 10 centipoise at a temperature of from about 50 to about 120° Centigrade, and wherein the ink is a solid at room temperature of from about 20° C. to about 40° C.

18. An ink composition in accordance with claim 7, wherein said colorant is a dye present in an amount of from about 0.05 to about 20 weight percent, and wherein said colorant is a dye of cyan, magenta, yellow, blue, green, brown, black, or mixtures thereof.

19. An ink in accordance with claim 7 wherein said colorant is a dye present in an amount of from about 1 to about 5 weight percent.

20. A printing process which comprises incorporating into an acoustic ink jet printer an ink comprised of a vehicle, colorant, and a hydrophobic gelling component, and wherein said hydrophobic gelling component is of the formula

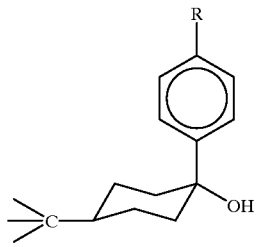

wherein R is alkyl, aryl, alkoxy, hydrogen, halide, or hydrocarbon halide.

21. A process in accordance with claim 20, wherein said ink is nonaqueous and wherein said ink possesses a viscosity of about 1 centipoise to about 25 centipoise at a temperature of from about 50° C. to about 125° C.

22. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, said ink comprising a vehicle, colorant, and a hydrophobic gelling component and (b) causing droplets of said ink to be ejected onto a recording sheet in an imagewise pattern at a temperature of from about 50° C. to about 125° C., and wherein said hydrophobic gelling component is of the formula

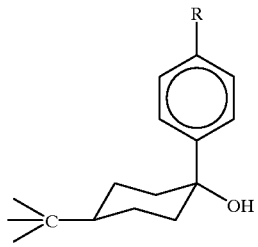

wherein R is alkyl, aryl, alkoxy, hydrogen, halide, or hydrocarbon halide.

23. A process in accordance with claim 22, wherein said ink is nonaqueous and wherein said ink possesses a viscosity of from about 1 centipoise to about 25 centipoise at a temperature of from about 50° C. to about 125° C.

24. An ink composition comprised of a colorant, a component of the following formula, and an ink vehicle

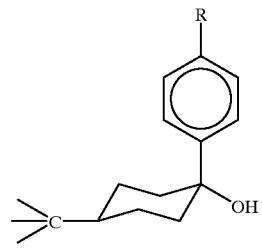

wherein R is alkyl, aryl, alkoxy, hydrogen, halide, or hydrocarbon halide.

25. An ink in accordance with claim 24, wherein said component is trans 4-tertiary-butyl-1-phenyl-cyclohexanol, said vehicle is an oxazoline or benzoxazoline, and which ink possesses a viscosity of from about 1 centipoise to about 25 centipoise at a temperature of from about 50° C. to about 125° C.

26. An ink comprised of a vehicle, a colorant, and a hydrophobic gelling component of the formula

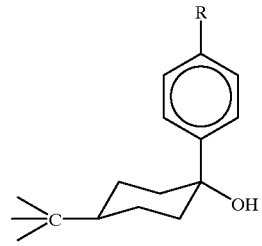

wherein R is a halide.

27. An ink comprised of a vehicle, a colorant, and a hydrophobic gelling component of the formula

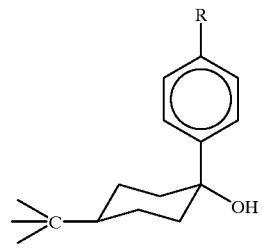

wherein R is a alkyl or alkoxy.

28. An ink comprised of a vehicle, a colorant, and a hydrophobic gelling component of the formula

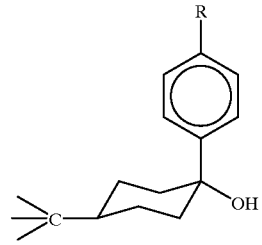

wherein R is aryl.

* * * * *